US011483271B2

(12) United States Patent
Weinberg et al.

(10) Patent No.: US 11,483,271 B2
(45) Date of Patent: *Oct. 25, 2022

(54) FORWARDING NOTIFICATION INFORMATION

(71) Applicant: Microsoft Technology Licensing, LLC, Redmond, WA (US)

(72) Inventors: Shira Weinberg, Tel Aviv (IL); Benny Schlesinger, Ramat Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,820

(22) Filed: Jun. 24, 2019

(65) Prior Publication Data
US 2019/0312832 A1 Oct. 10, 2019

Related U.S. Application Data

(63) Continuation of application No. 15/275,058, filed on Sep. 23, 2016, now Pat. No. 10,382,376.

(51) Int. Cl.
*H04L 51/214* (2022.01)
*H04L 51/224* (2022.01)
*H04L 67/55* (2022.01)

(52) U.S. Cl.
CPC .......... *H04L 51/214* (2022.05); *H04L 51/224* (2022.05); *H04L 67/55* (2022.05)

(58) Field of Classification Search
CPC .......... G06F 3/0482; G06F 9/54; G06F 9/542; G06F 13/00; G06F 15/16; G06Q 10/10; G06Q 10/107; G06Q 10/109; G06Q 30/02; H04L 12/58; H04L 12/581; H04L 12/585; H04L 12/5855; H04L 29/06; H04L 29/08;
(Continued)

(56) References Cited

U.S. PATENT DOCUMENTS 9,154,606 B2 * 10/2015 Tseng ........................ H04W 4/50
9,179,256 B1 * 11/2015 Pietraniec ............. H04W 4/023
(Continued)

*Primary Examiner* — Jeffrey R Swearingen
(74) *Attorney, Agent, or Firm* — Shook, Hardy & Bacon L.L.P.

(57) ABSTRACT

A computer-implemented technique is described herein by which a first user can forward notification information to one or more other users, including a second user. The first user can interact with the notification information via a first computing device, while the second user can interact with the notification information using a second computing device. In some implementations, both the first computing device and the second computing device have access to an application which has generated the notification information or to which the notification information otherwise pertains. In other implementations, the second computing device may lack access to the application. In some implementations, the first user receives the notification information and then explicitly and manually controls the forwarding of the notification information (or a version of the notification information) to the second user. In other implementations, decision logic automatically controls the forwarding of the notification information to the second user.

20 Claims, 13 Drawing Sheets

(58) Field of Classification Search
CPC ............... H04L 29/58; H04L 29/0809; H04L 29/08072; H04L 29/08981; H04L 51/14; H04L 51/24; H04L 67/26; H04L 67/306; H04W 4/20; H04W 4/203
USPC ............................. 709/206, 217; 715/752
See application file for complete search history.

(56) References Cited

U.S. PATENT DOCUMENTS

| | | | | |
|---|---|---|---|---|
| 9,195,479 | B2 * | 11/2015 | Queru | H04L 67/34 |
| 9,237,201 | B2 * | 1/2016 | Papakipos | G06Q 10/10 |
| 9,276,890 | B2 * | 3/2016 | Shia | H04L 51/24 |
| 9,348,626 | B2 * | 5/2016 | Newell | G06F 9/45545 |
| 2013/0036187 | A1 * | 2/2013 | Messer | H04W 4/203 |
| | | | | 709/217 |
| 2014/0032707 | A1 * | 1/2014 | Doshi | G06F 9/542 |
| | | | | 709/217 |
| 2015/0163188 | A1 * | 6/2015 | Faaborg | H04L 51/24 |
| | | | | 715/753 |
| 2015/0177970 | A1 * | 6/2015 | Choi | G06F 3/0488 |
| | | | | 715/752 |
| 2017/0339536 | A1 * | 11/2017 | Lewis | H04W 4/12 |
| 2017/0353603 | A1 * | 12/2017 | Grunewald | H04W 4/60 |

* cited by examiner understanding # FORWARDING NOTIFICATION INFORMATION

BACKGROUND

An operating system of a user computing device may provide a notification component, the purpose of which is to notify the user of occurrences that pertain to one or more applications installed on the user computing device and/or on remote computing functionality. For example, assume that the user computing device hosts a calendar application. The calendar application sends notification information to the notification component when a calendar-related occurrence has occurred, such as a change in a scheduled meeting time. In response, the notification component may display a notification on a display device, for consumption by the user who is interacting with the user computing device. In some implementations, the notification component can allow the user to activate the calendar application by interacting with the notification. Overall, a traditional notification component presents insight into what is happening with respect to an application running on one or more computing devices, for sole consumption by the user who is interacting with that application.

SUMMARY

A computer-implemented technique is described herein by which a first user can forward notification information to at least one other user (e.g., a second user). The first user can interact with the notification information via a first computing device, while the second user can interact with the notification information using a second computing device.

In some implementations, both the first computing device and the second computing device have access to an application which has generated the notification information or to which the notification information otherwise pertains. In other implementations, the second computing device may lack access to the application. For instance, the second computing device may not include the application among its set of locally installed applications, yet still receive the notification information as if it did include this application.

In some implementations, the first user receives the notification information and then explicitly and manually controls the forwarding of the notification information (or a version of the notification information) to the second user. In other implementations, decision logic automatically controls the forwarding of the notification information to the second user.

In some implementations, the technique relies on notification processing functionality (NPF) provided by the first and second computing devices. Alternatively, or in addition, the technique relies on NPF provided by at least one remote computing device (e.g., provided by a cloud service).

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
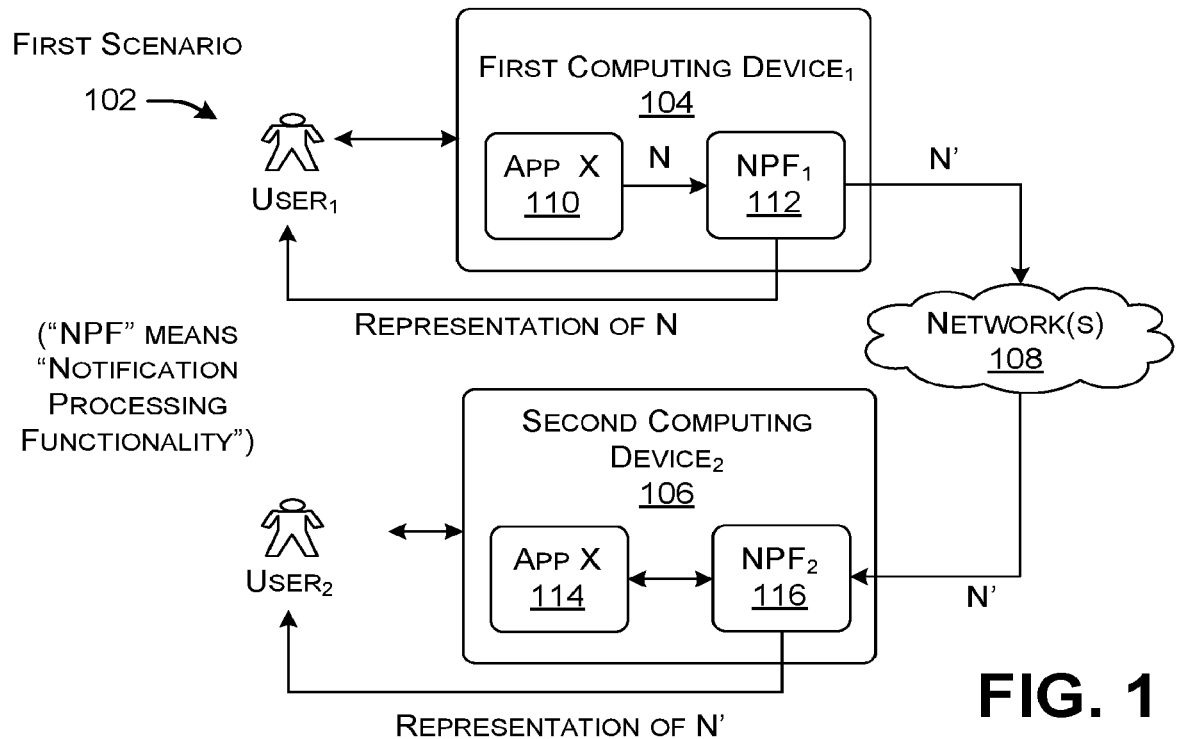
FIG. 1 shows a first implementation of a technique for forwarding notification information from a first user to a second user. In this case, both the first user and the second user have access to local versions of an application to which the notification information pertains.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for forwarding notification information, originally intended for consumption by a first user, to a second user. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered as optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a system 102 that represents a first implementation of a notification-forwarding service. The system 102 includes at least a first computing device 104, a second computing device 106, and one or more computer networks 108 for coupling the computing devices (104, 106) together. Each computing device (104, 106) can correspond to any user computing equipment, such as a stationary personal computing device, any type of handheld computing device (such as a smartphone), a game console, a set-top device, a wearable computing device, and so on. The computer network(s) 108 correspond to a local area network, a wide area network (e.g., the Internet), one or more point-to-point links, etc., or any combination thereof. Assume that a first user (user$_3$) interacts with the first computing device 104 and a second user (user$_2$) interacts with the second computing device 106. The first user refers to a different person than the second user.

The first computing device 104 includes one or more locally-installed applications, including at least an application X 110 The first computing device 104 also includes a first local instantiation of notification processing functionality (NPF$_1$) 112. Likewise, the second computing device 106 includes one or more locally-installed applications, including at least an application X 114. The second computing device 106 also includes a second local instantiation of notification processing functionality (NPF$_2$).

In operation, assume that application X 110 installed on the first computing device 104 sends notification information (N) to the NPF$_1$ 112. The notification information describes an occurrence pertaining to application X 110. For example, assume that application X 110 provides access to a social network service. Further assume that the social network service detects an update that affects the first user. In response, the application X 110 sends notification information to the NPF$_1$ 112 that identifies this update-related occurrence.

The NPF$_1$ 112 includes logic for forwarding the notification information N to the second user, who happens to be currently interacting with the second computing device 106. More specifically, FIG. 1 shows that the NPF$_1$ 112 sends notification information N' to the second computing device. The notification information N' forwarded by the NPF$_1$ 112 may correspond to the same notification information N received by the NPF$_1$ 112. In other cases, notification information N' may differ from the notification information N. For instance, the NPF$_1$ 112 can add one or more information items to the notification information N that it receives from the application X 110, and/or the NPF$_1$ 112 can remove one or more information items from the notification information N that it receives from the application X 110. Later figures and accompanying explanation will provide additional details regarding the exemplary composition of notification information N' that is transmitted by the NPF$_1$ 112, relative to the notification information N that is received by the NPF$_1$ 112.

To facilitate description, the notification information N received by the NPF$_1$ 112 will be henceforth referred to as first notification information or original notification information, while the notification information N' forwarded by the NPF$_1$ 112 will be referred to as second notification information or forward notification information, where the second notification information can be the same as, or different than, the first notification information. In certain cases, to simplify and disencumber the explanation, an instance of notification information will be referred to simply as a "notification."

As will be described in greater detail below, different triggering occurrences can cause the NPF$_1$ 112 to send the forward notification information N' to the second user. In a first case, the NPF$_1$ can produce a visual representation of the original notification information N that it receives from the application X 110. The first user may view the original notification information N and enter an explicit instruction to send the forward notification information N' to the second user. In another case, the NPF$_1$ can incorporate decision logic that examines the original notification information N that it receives from the application X 110. The decision logic then determines whether or not to send the forward notification information N' to the second user, e.g., by using a rule application engine (together with a set of rules) and/or a machine-trained model, to be described below.

Although not shown in FIG. 1 (but is described at length below), the NPF$_1$ 112 can specify that the forward notification information N' should be sent to the second user, without also identifying the computing device at which the second user will receive the forward notification information. User-to-device mapping logic (not shown in FIG. 1) can then use one or more rules to specify the device endpoint(s) to which the forward notification information N' should be directed—that is, by mapping the chosen user to a particular device or devices. The user-to-device mapping logic can then send the forward notification information N' to the designated device endpoint(s). Assume that the second computing device 106 represents one such designated device endpoint. In one implementation, one or more remote computing devices implement the user-to-device mapping logic.

Upon receipt of the forward notification information N', the NPF$_2$ 116 of the second computing device 106 can generate a visual representation of the forward notification information N' to the second user. In one implementation, the second user can click on or otherwise activate the forwarded notification N' to invoke the local version of the application X 114 running on the second computing device 106. Other implementations can use other rules to govern the manner in which the forward notification information N' is revealed to the second user, and the behavior of the NPF$_2$ 116 when the user interacts with the visual representation of the forwarded notification information N'.

Overall, a notification component traditionally presents insight into what is happening with respect to software running on a single local computing device and/or on some other computing functionality to which the user has access via the local computing device, for sole consumption by the user who is interacting with that single computing device. The system 102 extends this approach by providing a way to transfer notification information to other users who are interacting with other respective computing devices. More specifically, this extension involves at least three modifications to traditional notification functionality. First, the traditional notification functionality is extended such that it includes the capability of forwarding notification information to another user (or users). Second, the traditional notification functionality is extended such that it includes the capability of receiving notification information from two sources: a source application and another instance of NPF. Third, the traditional notification functionality is modified to include additional provisions (described below) to address the increased complexity brought about by the first and second-mentioned changes.

The NPF can be applied in various use scenarios. In one use scenario, for the first user may receive original notification information N from a calendar application regarding a change in a meeting time. The first user may opt to send forward notification information N' to another user who has not been formally invited to the meeting, and therefore will not have received his or her own notification of the change in the meeting time. In another use scenario, the first user may receive original notification N from a social network application. The first user may opt to send forward notification information N' to another user because the first user believes that the other user may be interested in the occurrence described by the original notification information N. In a third scenario, a parent may set up a child's computing device so that it forwards all instances of notification information that it receives to the parent's computing device or devices.

Note that the NPF$_2$ 116 is also able to view original notification information generated by its own local version of application X 114. With appropriate permissions, the NPF$_2$ 116 can also pass along the forward notification information N' that it receives from application X 110 (provided by the first computing device 104) to yet another (third) user. The NPF$_2$ 116 can also apply various safeguards (described below) to ensure that its ability to receive forward notification information N' does not confuse or annoy the second user, and does not introduce security-related vulnerabilities, etc.

Note that the system 102 has been described above in the context in which the forward notification information N' originates from application X running on the first computing device 104. But these roles can be reversed, such that NPF$_2$ 116 of the second computing device 106 can send forward notification information N' generated by its own local version of application X 114 to the first computing device 104. In other words, NPF$_1$ 112 is the full counterpart of NPF$_2$ 116, and vice versa; each can perform the same functions as the other.

Note that the NPF$_1$ 112 and the NPF$_2$ 116 can exchange instances of notification information within the notification processing framework provided by the computing devices (104, 106), without relying on supplemental communication applications or other implementation-specific provisions. For instance, the NPF$_1$ 112 can send the forward notification information N' to the NPF$_2$ 116 by a direct peer-to-peer channel, and/or by routing the forward notification information N' via a notification service provided by one or more remote computing devices. In other cases, however, the NPF$_1$ 112 and the NPF$_2$ 116 can share notification information using one or more separate communication applications, such as an Email application, a Short Message Service (SMS) application, an Instant Messaging (IM) application, and so on. The former implementation has the advantage over the latter because it is not reliant on the collection of supplemental messaging programs installed on the first and second computing devices (104, 106). In other words, in the former implementation, the two instances of NPF (112, 116) are sufficient to perform the forwarding operation as a baseline application-agnostic and platform-agnostic notification service. Such a notification service can be implemented as an operating system resource, or a generic application resource, etc., or a combination thereof.

In another variation, the $NPF_1$ 112 (or $NPF_2$ 116) can send the forward notification information N' to two or more users. For example, a first user can send forward notification information N' pertaining to an upcoming meeting to all users who will be attending that meeting. In another variation, the $NPF_1$ 112 (or $NPF_2$ 116) can send the forward notification information N' to another destination endpoint besides a computing device (or devices). For example, the $NPF_1$ 112 can send the forward notification information N' to a server computing device, which then, in turn, posts the notification information to a group of people (and possibly the entire public). In another case, the $NPF_1$ 112 can send the forward notification information N' to an archival site for storage thereat.

Figure 2:
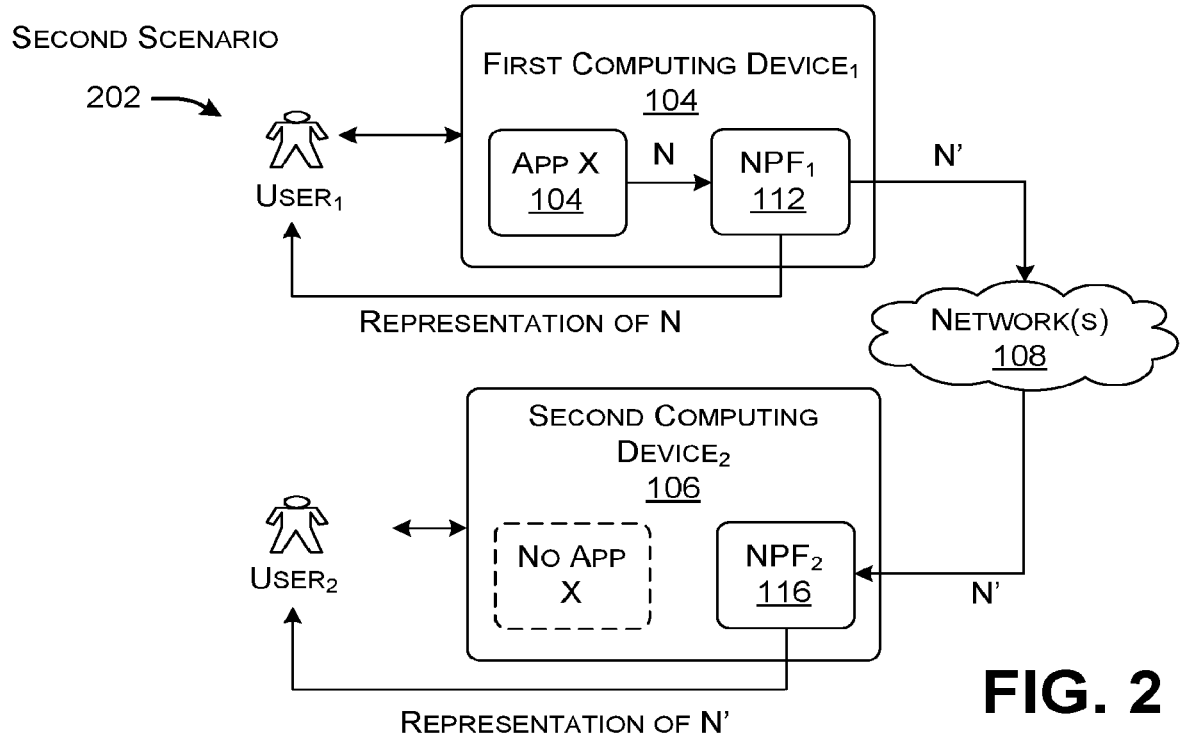
FIG. 2 shows a second implementation of a technique for forwarding notification information from the first user to the second user. In this case, the second user lacks access to a local version of the application.

FIG. 2 shows a system 202 that has the same components as the first system 102, including a first computing device 104 coupled to a second computing device 106 via one or more computer networks 108. In the second system 202, however, the second computing device 106 does not have a local version of application X. This means that $NPF_2$ 116 (provided by the second computing device 106) may receive forward notification information N' pertaining to application X, even though the second computing device 106 does not host a local version of this application. Again, the $NPF_2$ 116 can apply various safeguards (described below) to ensure that this capability does not confuse or annoy the second user, and does not introduce security-related vulnerabilities, etc.

In a related scenario, the second computing device 106 includes the application to which the forward notification information N' pertains. But the forward notification information N' pertains to a particular user account or particular matter associated with the first user, to which the second user does not have access. In this case, when the user clicks on the forward notification information N', the application X may inform the user that he or she is prohibited from acting on the forward notification information N'. But the user remains free at this time to interact with the application X to perform other functions.

Figure 3:
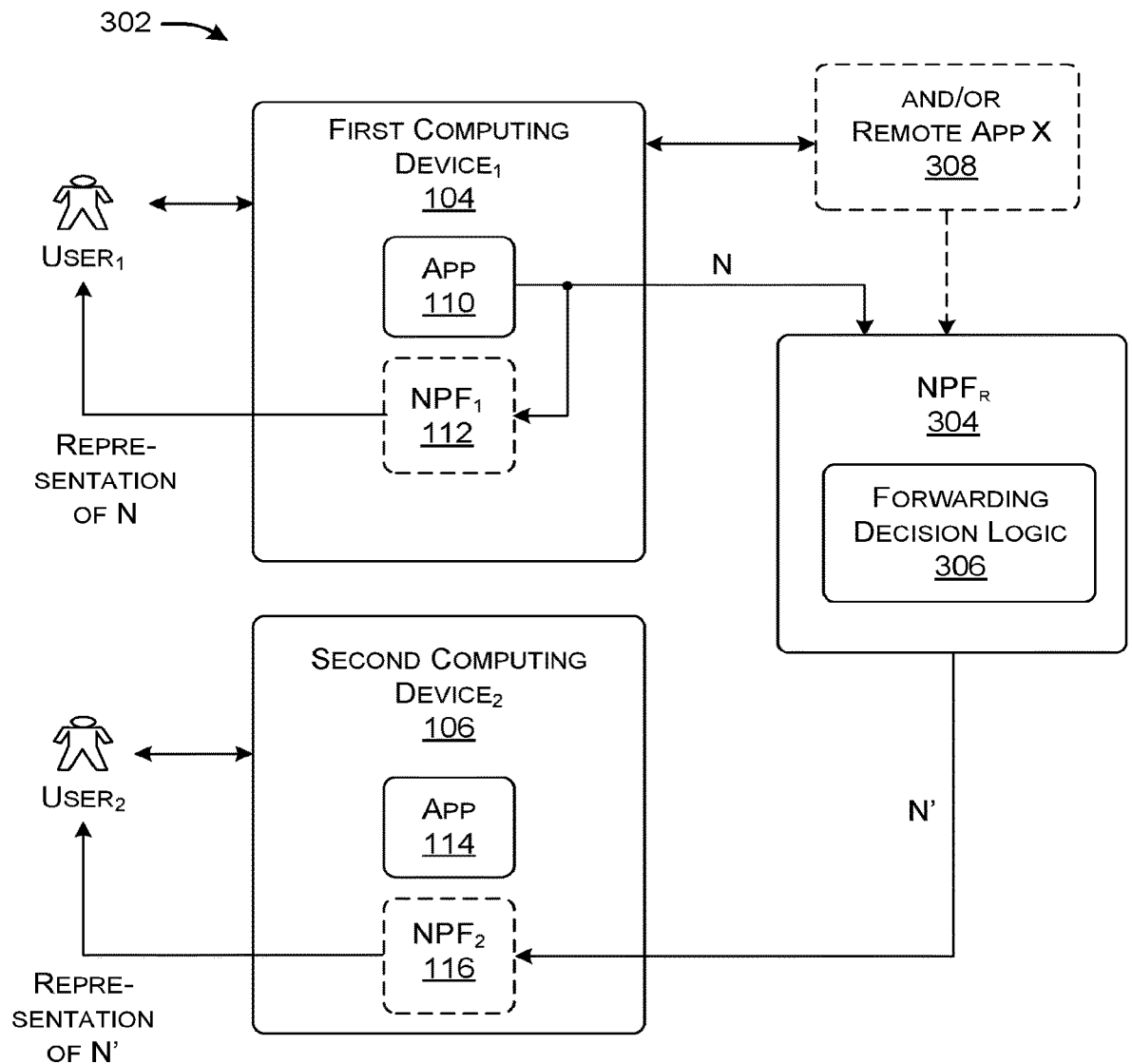
FIG. 3 shows a third implementation of a technique for forwarding notification information from the first user to the second user. The third implementation leverages functionality provided by one or more remote computing devices.

FIG. 3 shows another system 302 that includes some of the same components as the first system 102, including a first computing device 104 coupled to a second computing device 106. The first computing device 104 includes one or more applications, including a local version of application X 110. The second computing device 106 hosts one or more applications, including a local version of application X 114 (as in the example of FIG. 1), or possibly omitting application X 114 (as in the example of FIG. 2). The first computing device 104 can (optionally) include a local $NPF_1$ 112, while the second computing device 106 can (optionally) include a local $NPF_2$ 116. FIG. 3 differs from the systems (102, 202) of FIGS. 1 and 2 by indicating that any of the functions performed by the local instances of the NPF ($NPF_1$ 112, $NPF_2$ 116) can, alternatively, or in addition, be performed by remotely-implemented notification processing functionality ($NPF_R$) 304.

For instance, in one among many modes of operation, the local version of application X 110 running on the first computing device 104 can send original notification information N to the local $NPF_1$ 112 and the remote $NPF_R$ 304. The local $NPF_1$ 112 can instruct the first computing device 104 to provide a visual representation of the original notification information N for consumption by the first user. The $NPF_R$ 304 can determine whether or not to send forward notification information N' to the second computing device 106, e.g., by based on forwarding decision logic 306. In doing so, the $NPF_R$ 304 effectively assumes a processing role performed by the $NPF_1$ 112 in the first implementation. Upon receipt of the forward notification information N', the local $NPF_2$ 116 of the second computing device 106 can provide a visual presentation of the forward notification information N' for consumption by the second user.

In other implementations, the remote $NPF_R$ 304 can assume other roles performed by the local instances of the NPF (e.g., $NPF_1$ 112 and $NPF_2$ 116). For instance, the remote $NPF_R$ 304 can play a role in presenting a visual representation of the original and forward notification information.

Further note that an application which generates notification information can be implemented in whole or in part by a remote computing system. For example, the system 302 can include a remote version of application or service X 308, which operates by itself, or in conjunction with the local versions of application X (110, 114) provided by the local computing devices (104, 106). That remote application or service X 308 may represent the ultimate source of the notification information N. In a first case, both the first user and the second user have access to the remote application or service X 308, which parallels the scenario of FIG. 1. In a second case, just the first user has access to the remote application or service X 308, which parallels the scenario of FIG. 2.

The system 302 can process notification information generated by remote application or service X 308 in different ways. In one case, the remote application or service X 308 can send the notification directly to the remote $NPF_R$ 304. Alternatively, or in addition, the remote application or service X 308 can send the notification to local $NPF_1$, corresponding to the computing device which happens to be interacting with the remote application or service at the present time.

Figure 4:
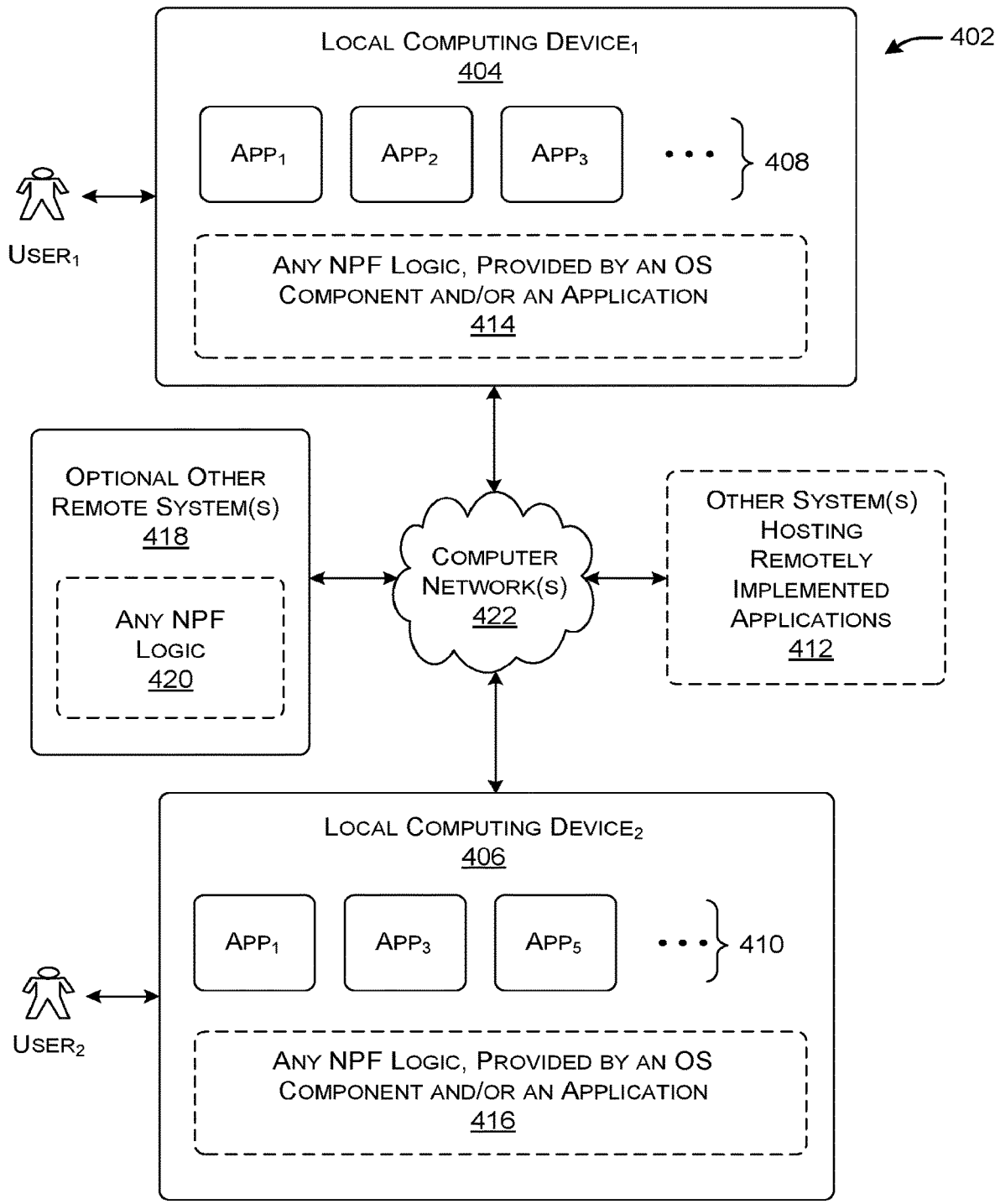
FIG. 4 shows a system that provides a generalized overview of the principles introduced in the context of FIGS. 1-3.

FIG. 4 shows a system 402 that provides a generalized overview of the principles introduced in the context of FIGS. 1-3. The system 402 includes at least a first computing device 404 associated with a first user, and a second computing device 406 associated with a second user. The first computing device 404 hosts a first set 408 of locally installed applications, while the second computing device 406 hosts a second set 410 of locally installed applications. The first set 408 may be the same as, or different from, the second set 410. The local computing devices (404, 406) can be implemented in any of the ways described above. One or more remote computing systems 412 can host additional remote applications. The remote computing system(s) 412 can include server computing devices and other computing equipment (e.g., routers, firewall functionality, etc.).

NPF logic can be distributed among the components of the system 402 in any manner. For example, the first computing device 404 can include any NPF logic 414. That NPF logic 414 can be implemented as operation system (OS) level functionality and/or as application-level functionality. Similarly, the second computing device can include any NPF logic 416. That NPF logic 416 can be implemented as OS-level functionality and/or as application-level functionality.

One or more other remote computing systems 418 can also perform NPF-related tasks. For example the remote computing system(s) 418 can include NPF logic 420 for intercepting notifications and determining whether to forward the notifications to particular users. The remote computing system(s) 418 can include server computing devices and other computing equipment (e.g., routers, firewall functionality, etc.).

One or more computer networks 422 couple the above-described components together. As described above, the computer network(s) 422 can include any local area network, a wide area network (e.g., the Internet), one or more point-to-point links, etc.

Figure 5:
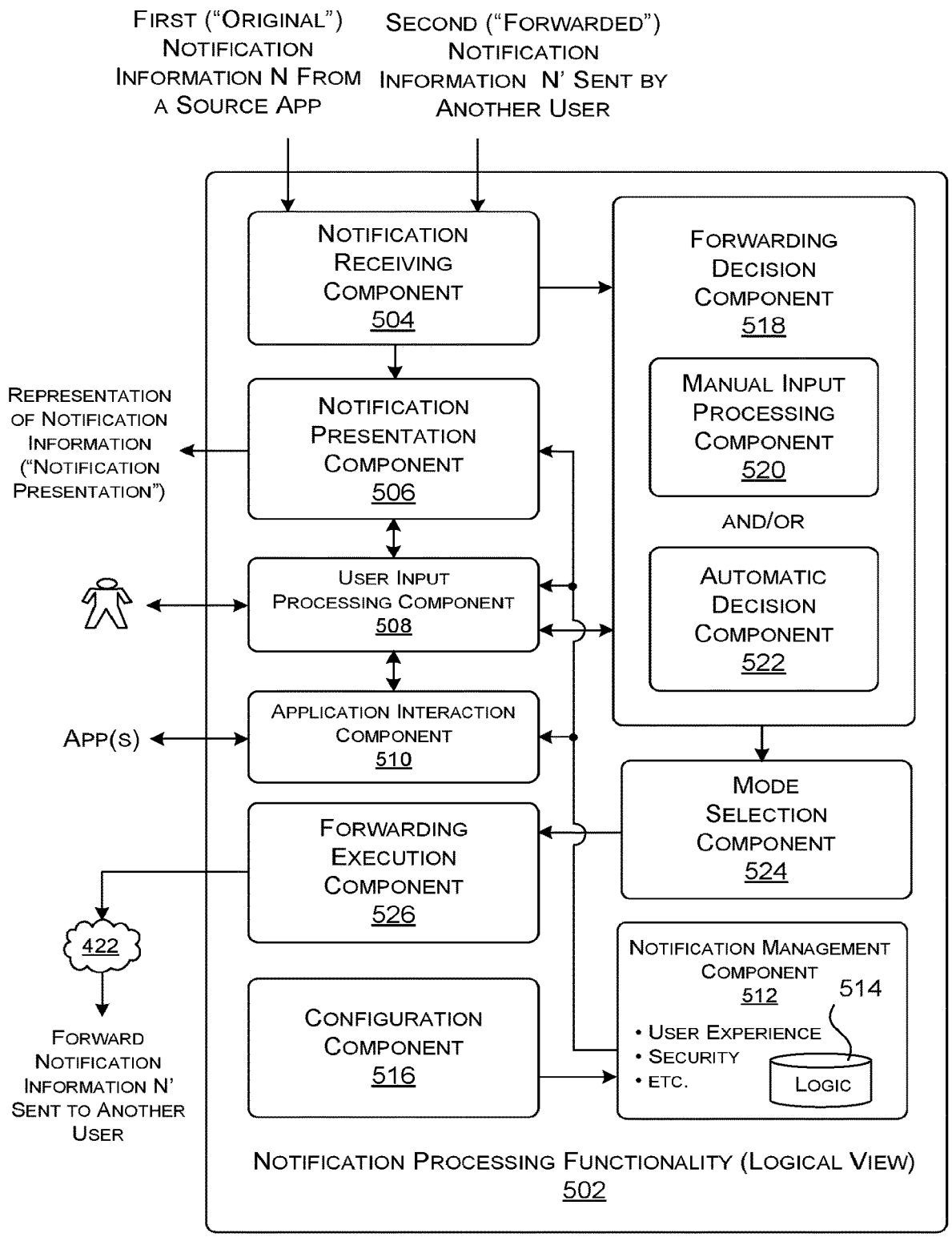
FIG. 5 is a logical depiction of one implementation of notification processing functionality (NPF). The NPF can be hosted by one or more components of the system of FIG. 4.
Figure 6:
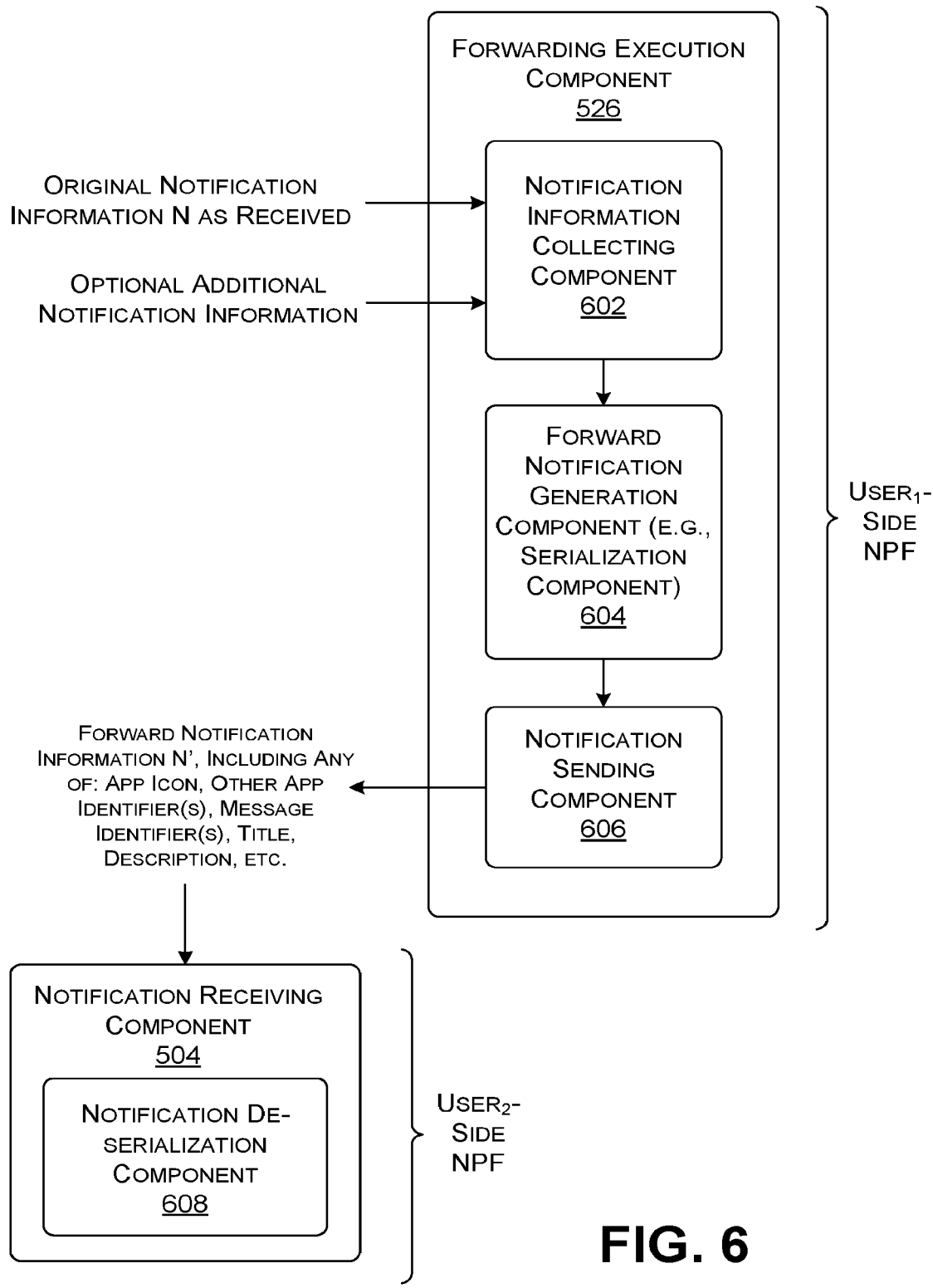
FIG. 6 shows one implementation of a forwarding execution component and a notification receiving component, corresponding to components of the NPF of FIG. 5.

FIG. 5 shows one implementation of notification processing functionality (NPF) 502. More specifically, FIG. 5 illustrates the functions of the NPF 502 as being physically associated with a single and self-contained module. While this is possible, many other implementations distribute different components of the NPF 502 shown in FIG. 5 among the different computing devices of FIG. 4. In other words, FIG. 5 is a logical depiction of the NPF, not necessarily a physical literal depiction.

A notification receiving component 504 receives notification information from some source entity. In certain cases, the notification receiving component 504 can receive first or original notification information (N) provided by a source application when that source application detects an occurrence that merits reporting. In other cases, the notification receiving component 504 can receive second or forward information (N') provided by some other instance of NPF. In some implementations (but not other implementations), the forward notification information N' can include a metadata value (and/or other information) that reveals that it is forward notification information, and not original notification information.

More specifically, in some circumstances, the user who interacts with the NPF 502 is the first user shown in FIGS. 1-3, corresponding to the user who views the original notification information N and who sends the forward notification information N' to the second user. In other circumstances, the user who interacts with the NPF 502 is the second user shown in FIGS. 1-3, corresponding to the user who receives forward notification information N' from the first user.

A notification presentation component 506 provides a notification presentation that presents a representation of the notification information that is received. In the examples which follow, the notification presentation component 506 provides the notification presentation in the form a graphical user interface presentation. Alternatively, or in addition, the notification presentation component 506 can provide the notification presentation in audible form, haptic form, etc., or any combination thereof.

A user input processing component 508 receives input from the user using any input device(s), examples of which are cited in Section C. For instance, the user input processing component 508 can receive the user's input when the user interacts with the notification presentation, provided by the notification presentation component 506. Later figures provide examples of how (and why) a user may engage with the notification presentation.

An application interaction component 510 invokes an application in certain cases. For example, assume that the user receives notification information that pertains to an application X. Further assume that the user is interacting with a computing device that hosts the application X. And further assume that the user clicks on or otherwise activates the notification presentation. In this circumstance, the application interaction component 510 can activate the application X. By doing so, the user can address whatever issue is raised by the notification, e.g., by directly interacting with application X.

A notification management component 512 applies logic (provided in a data store 514) for governing the operation of at least the notification presentation component 506, the user input processing component 508, and the application interaction component 510. For instance, the logic may include a rule application engine together with a set of rules, and/or a machine-learned model. The logic can govern how (and if) notification information is presented to the user in a notification presentation, how (and if) the user is permitted to interact with the notification presentation, and what actions (if any) are performed when the user does interact with the notification presentation.

Different logic may apply to different use scenarios. In one environment, the notification management component 512 can determine whether the received notification information N' (forwarded by the first user) complies with one or more security-related provisions. The notification management component 512 can allow the NPF 502 to present the received notification information, and then allow the recipient user to interact with the notification presentation, only when the notification management component 512 determines that it is safe to do so.

For instance, the notification management component 512 can determine whether the notification information originates from an accepted user (e.g., associated with a particular user ID) and/or from an accepted computing device (e.g., associated with a particular device ID). In addition, or alternatively, the notification management component 512 can determine whether the notification information includes a required key or otherwise conforms to a required security encoding provision. To function in this manner, the notification management component 512 can perform a setup process; in this process, the user (who will be the recipient of incoming notification information) may define the users and devices that qualify as accepted users and devices. The user can also grant credentials to certain users and devices, e.g., in the form of security keys or the like. Alternatively, or in addition, the notification management component 512 can perform any security-related analysis on incoming notification information, including comparing the notification information with a database of known threat information.

The notification management component 512 can apply other rules that serve the purpose of providing a desired user experience. Stated in the negative, the notification management component 512 can apply logic which is designed to prevent the user who receives notification information from: (a) being overwhelmed with too many instances of notification information; and/or (b) receiving low-value (uninteresting) instances of notification information. For example, the notification management component 512 can throttle the number of instances of notification information ("notifications" below, for brevity) that are presented such that the number does not exceed a prescribed threshold rate. To do so, the notification management component 512 can present only the most important notifications. The notification management component 512 can gauge the importance of a notification in different ways, such as based on any of: explicit priority information associated with the notification; the source of the notification; the content of the notification; and/or whether the user has access to the application to which the notification pertains, etc.

According to another rule, the notification management component 512 can prohibit the presentation of forward notification information N' when it determines that the user has already received the notification information from another source, such as a locally installed application. For instance, assume that two users both have access to the same calendar application and both users are planning to attend the same meeting. Assume that the first user receives a notification from a local version of the calendar application, informing the user that the meeting time has changed. If the first user attempts to forward that notification information to the second user, the notification management component 512 can prohibit its presentation; it will do so if it determines that the second user has already received (or will soon receive) the same notification from his or her local version of the calendar application. The notification management component 512 can determine equivalence between two instances of notification information in different ways, such as based on the content of the instances of notification information, identifiers assigned to the instances, etc.

A configuration component 516 allows a user to configure the logic provided by the notification management component 512 and/or any other component of the NPF 502. For instance, the configuration component 516 can provide one or more setup user interface presentations when invoked. The user can interact with the setup user interface presentations to define the rules to be applied by the notification management component 512, and to populate a list of users and/or devices that are permitted to forward instances of notification information to the user, etc.

A forwarding decision component 518 determines whether or not to forward an instance of notification information, received by the notification receiving component 504, to one or more other users. The forwarding decision component 518 can make this decision using a manual input processing component 520 and/or an automatic decision component 522. In the context of the explanation below, the first user refers to the user who sends the notification information N', and the second user refers to the user who receives the forward notification information N'.

The manual input processing component 520 receive an explicit instruction from the first user to forward the notification information. The first user can provide this instruction by interacting with a graphical notification presentation in the manner to be described below.

The automatic decision component 522 uses decision logic to automatically determine whether to send the forward notification information N' to one or more other users. The decision logic can include a rule application engine in conjunction with a set of rules, and/or a machine-trained model, etc. The decision logic can depend on any factors, including, but not limited to: explicit priority information associated with the original notification information N; the user-related source of the original notification information N; the device-related source of the original notification information N; the content of the original notification information N; the candidate target user who will receive the forward notification information N'; the candidate target device that will receive the forward notification information N'; the date; the time of day; the preferences of the first user and/or candidate target user, and so on. The configuration component 516 can allow a user to configure the operation of the forwarding decision component 518, e.g., by defining the logic it will apply to the forwarding of notifications.

Note that the automatic decision component 522 and the notification management component 512 filter the flow of notification information at different points along the path of the notification information. More specifically, the automatic decision component 522 determines whether an instance of forward notification will be sent to a target user (and a target user computing device). The notification management component 512 governs when a target computing device, having received an instance of forward notification information, is permitted to present it, and whether the user it permitted to interact with it once presented.

A mode selection component 524 implements the above-described user-to-device mapping logic described above. In other words, assume that the forward decision component 518 authorizes the sending of an instance of forward notification information to a particular target user, but does not, at this stage, define how the forward notification information is to be delivered to the target user. The mode selection component 524 uses the user-to-device mapping logic to determine the computing device or devices associated with the target user to which the forward notification information will be directed. Again, the user-to-device mapping logic can be implemented by a rule application engine and/or a machine-trained model. For example, the user-to-device mapping logic can take into consideration: whether or not the target user is interacting with a candidate computing device, as reflected by presence information transmitted by that candidate computing device to the mode selection component 524; the present location of the target user; the present activity level of the target user; the calendar status of the target user; the preferences of the target user; the preferences of the forwarding user, and so on. The mode selection component 524 can determine the location and activity status of the target user using known techniques, e.g., using location determination devices and movement-sensing devices provided by a smartphone carried by the target user. A user can define the logic applied by the mode selection component 524 using the configuration component 516, in the manner described above. Overall, the use of the mode selection component 524 improves the chances that the target user will receive the forward notification information N', e.g., by reducing the risk that the first user will send the forward notification information N' to a target computing device that is powered off and not being currently used by the second user.

Finally, a forwarding execution component 526 performs the task of actually sending the forward notification information N' to the target user, for consumption by the target user on a target computing device. Advancing to FIG. 11, this figure shows one implementation of the forwarding execution component 526. The forward execution component 526 can include subcomponents that performs different respective tasks.

For instance, a notification information collecting component ("collecting component" for brevity) 602 collects information items that will be used to populate the forward notification information N' that will be sent to the target user. The collecting component 602 can receive all of the information items from the original notification information N, e.g., as provided by the source application which provides the original notification information N. Those information items can include a textual identifier (or identifiers) associated with the source application, an icon associated with the source application, one or more control features associated with the notification information, a title associated with the notification information, a description associated with the notification information, a message identifier associated with the notification information, and so on. With respect to the control features (if included in the notification information), a control feature governs the manner in which the target user is permitted to interact with a visual notification presentation. For example, a control feature may define a bitmap that presents one or more graphical control elements. With respect to the message identifier, a receiving NPF can leverage the message identifier to determine whether it has already received the same instance of notification information on a prior occasion. That same instance of the notification information can correspond to original notification information N (e.g., sent by a locally-installed application) or forward notification information N' (e.g., forwarded by another user).

The collecting component 602 can also receive information items from other sources, where such information items are not necessarily provided by the original notification information N. For example the collecting component 602 can receive an identifier that identifies the user who is forwarding the notification. In addition, or alternatively, the collecting component 602 can receive supplemental identifiers which describe the application that has furnished the notification information. A receiving NPF can leverage the additional identifier(s) in the case that it is prohibited, for any environment-specific reason, from displaying the icon conveyed by the original notification information N. The collecting component 602 can also add one or more metadata values which identify the forward notification information N' as a forwarded-type instance of notification information N', in contrast to an original instance of notification information N.

A forward notification generation component 604 ("generation component" for brevity) generates the forward notification information N' to be sent based on the component information items assembled by the collection component 602. The generation component 604 can perform this task using any environment-specific serialization technique.

A notification sending component 606 performs the task of actually sending the forward notification information N' to the target user at a target device endpoint or device endpoints. The notification sending component 606 can perform this task by selecting an appropriate communication channel based on channel selection logic, and then using a network interface to send the forward notification information N' over the selected communication channel. In one case, the notification sending component 606 can send the forward notification information N' using a direct peer-to-peer channel. In another case, the notification sending component 606 can send the forward notification information N' via a remote computing device that functions as a router.

Further, in one case, the notification sending component 606 sends the forward notification information N' via a native framework associated with the NPF 502 itself, without involvement of any supplemental communication application. In another case, the notification sending component 606 sends the forward notification information N' using one or more external communication applications, such as an Email application, etc.

The notification receiving component 504 on the target computing device includes a notification de-serializing component 608. The de-serializing component 608 can extract the information items which compose the instance of forward notification information N' that is received.

The remainder of the figures in this section describes various user interface presentations provided by the notification presentation component 506 of FIG. 5. The NPF 502 uses the user input processing component 508 to receive input when the user interacts with the user interface presentations. In some cases, the user refers to the above-described first user who views an instance of original notification information N, corresponding to a person named George herein. In other cases, the user refers to the above-described second user who views an instance of forward notification information N', corresponding to a person named Sally herein. Further note that the second user (Sally) can also perform the same role as the first user (George), e.g., by forwarding a received instance of forward notification (from George) to another user (e.g., Diane). Finally, although the figures show the presentation of notification information in visual form, the NPF 502 can also present the notification information in audio form, haptic form, etc., or any combination thereof.

Figure 7:
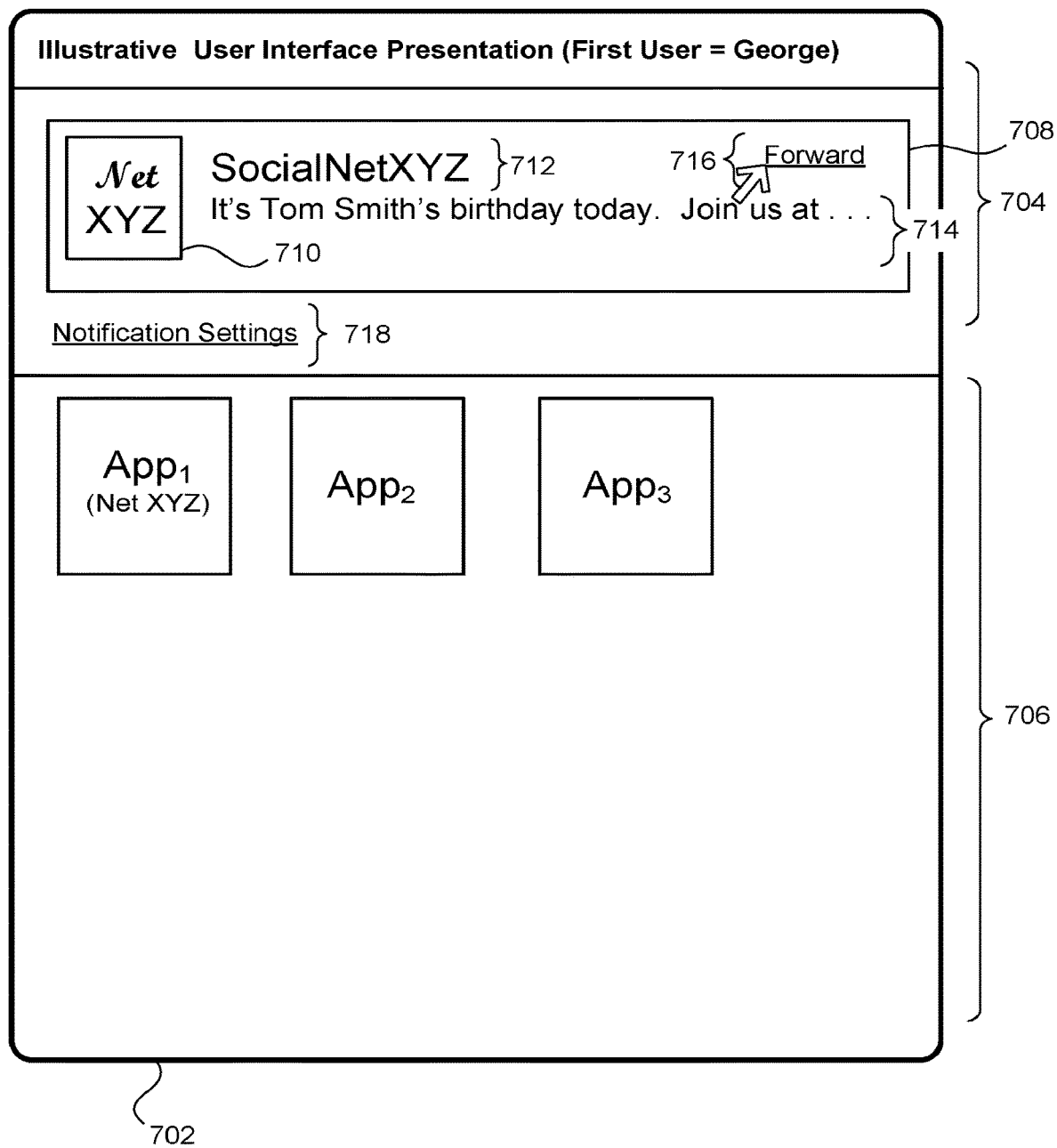
FIG. 7 shows a user interface presentation that includes a notification presentation, provided to a first user. The notification presentation displays notification information. The notification presentation also includes a prompt that invites the first user to send the notification information to a second user.

FIG. 7 shows a user interface presentation 702 that the notification presentation component 506 provides to a first user. The user interface presentation 702 includes a first region 704 for displaying visual representations of notification information ("notification presentations" for brevity), and a second region 706 for displaying any other information.

In the example of FIG. 7, the first region 704 shows a notification presentation 708 generated by a local version of a social network application. The notification presentation 708 includes an icon 710 which identifies the social network application, a textual title 712, and a description 714. The notification presentation 708 also includes a forwarding control prompt 716. The user may actuate the forwarding control prompt 716 to initiate a process by which the original notification information N is sent to another user as forward notification information N'.

A "Notification Settings" control prompt 718 allows the user to invoke the configuration component 516 of FIG. 5. The user may activate this prompt to control any aspect of the functions performed by the NPF 502, set forth above.

Figure 8:
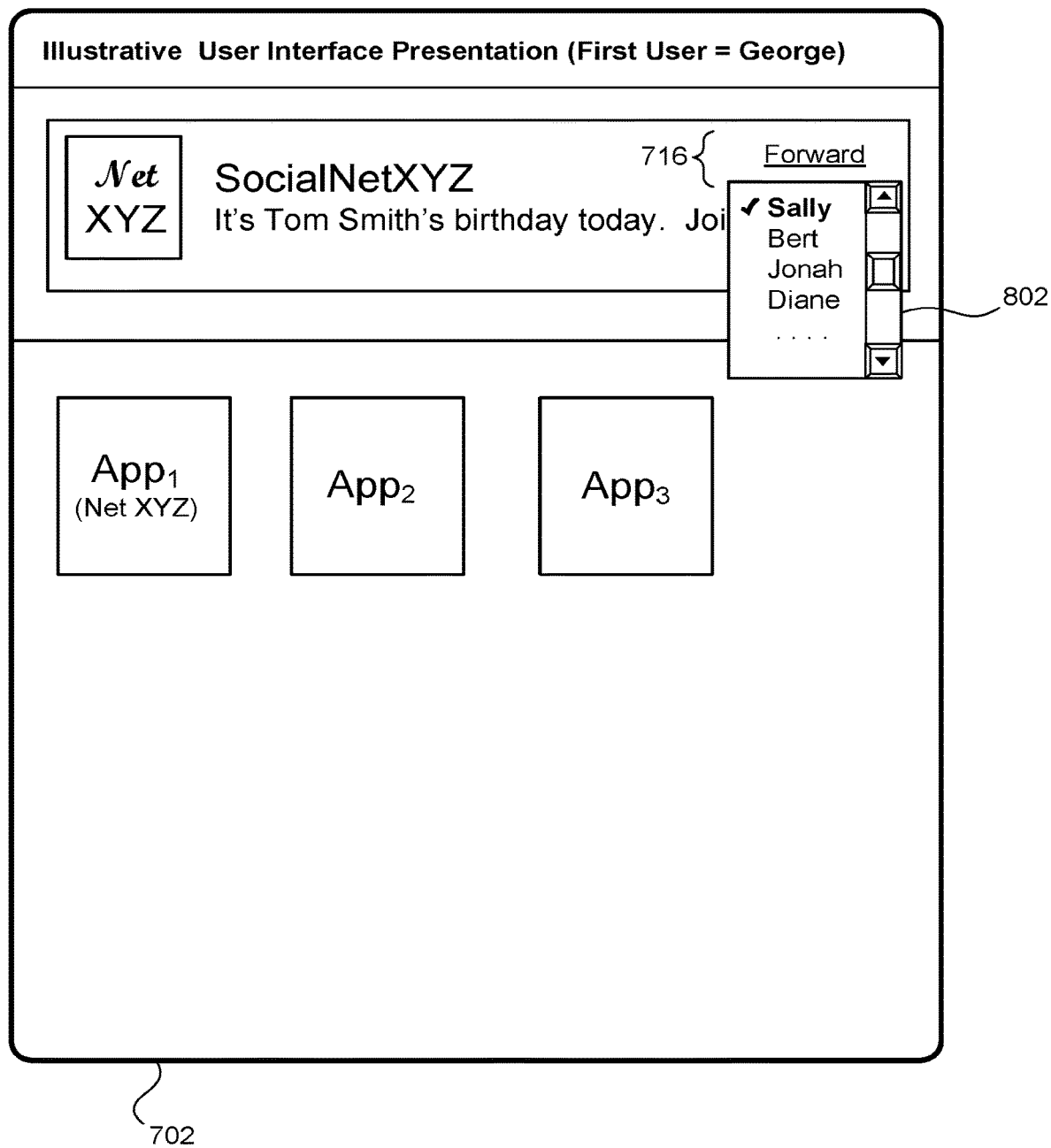
FIG. 8 depicts one manner by which the first user may interact with the notification presentation of FIG. 7 to select a particular second user.

Advancing to FIG. 8, assume that the user activates the forwarding control prompt 716. In response, the notification presentation component 506 provides a picker-type control feature 802. The picker-type control feature 802 shows a list of contacts associated with the first user (George). Assume that the first user engages the picker-type control feature 802 to choose a particular second user, Sally.

Figure 9:
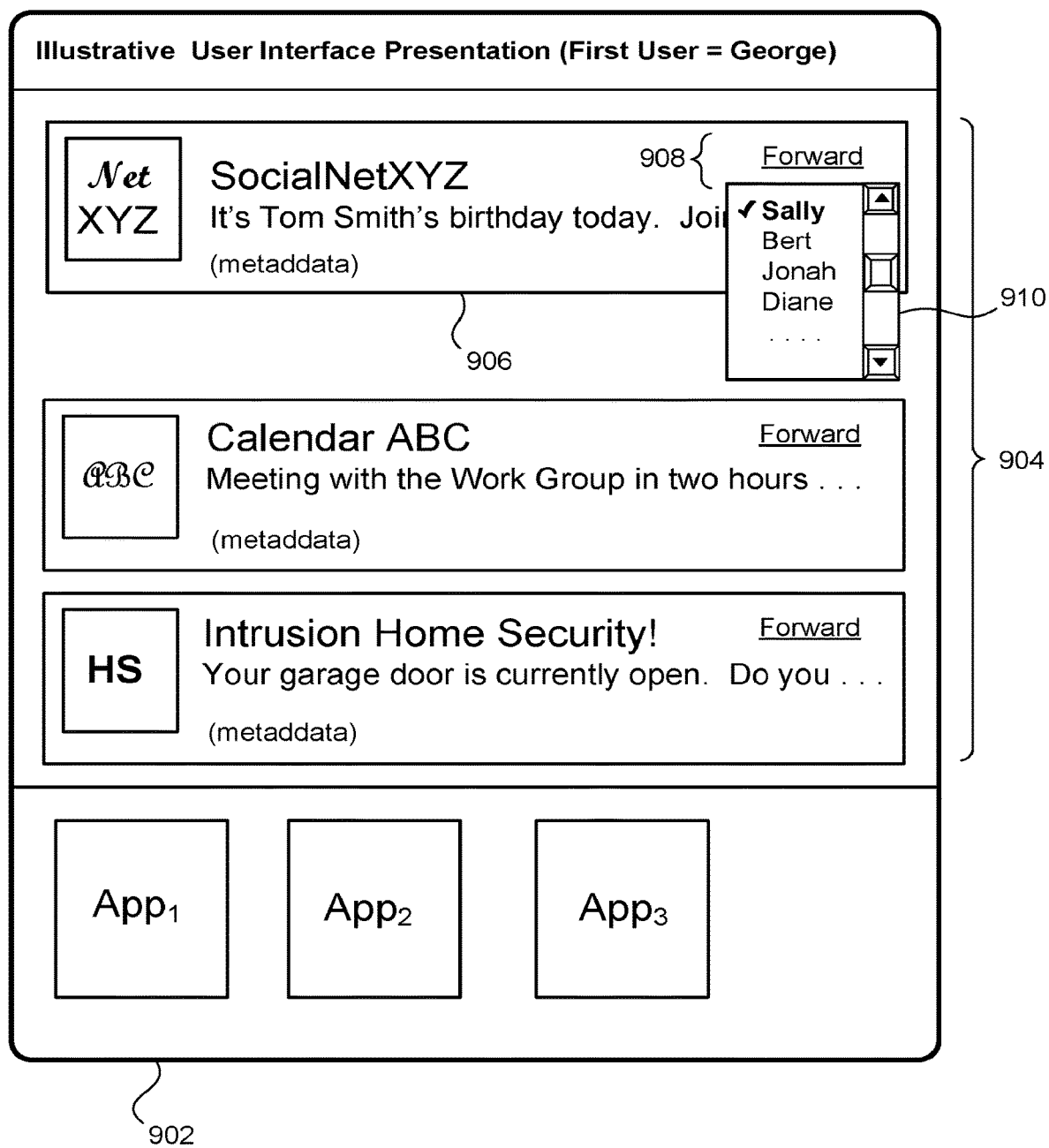
FIG. 9 shows another user interface presentation that includes a notification presentation that displays plural instances of notification information.

FIG. 9 shows another user interface presentation 902 associated with another scenario in which a user may send forward notification information N' to another user. In this case, the first user activates a "Notification History" control feature (not shown). In response, the notification presentation component 506 displays a list of the n most recent instances of original notification information N 904 that have been received by the user (George). The user can filter this list in any manner, e.g., by restricting the list of notifications to original notifications (as opposed to forwarded notifications), by restricting the list of notifications to a particular span of time, by restricting the list of notifications to certain applications, etc.

Assume that the user chooses a first notification presentation 906 in the list, and then activates the forwarding control prompt 908 associated with that notification presentation 906. In response, the notification presentation component 506 presents a picker-type control feature 910. Assume that the user again selects "Sally" as the target user within the picking-type control feature 910.

Figure 10:
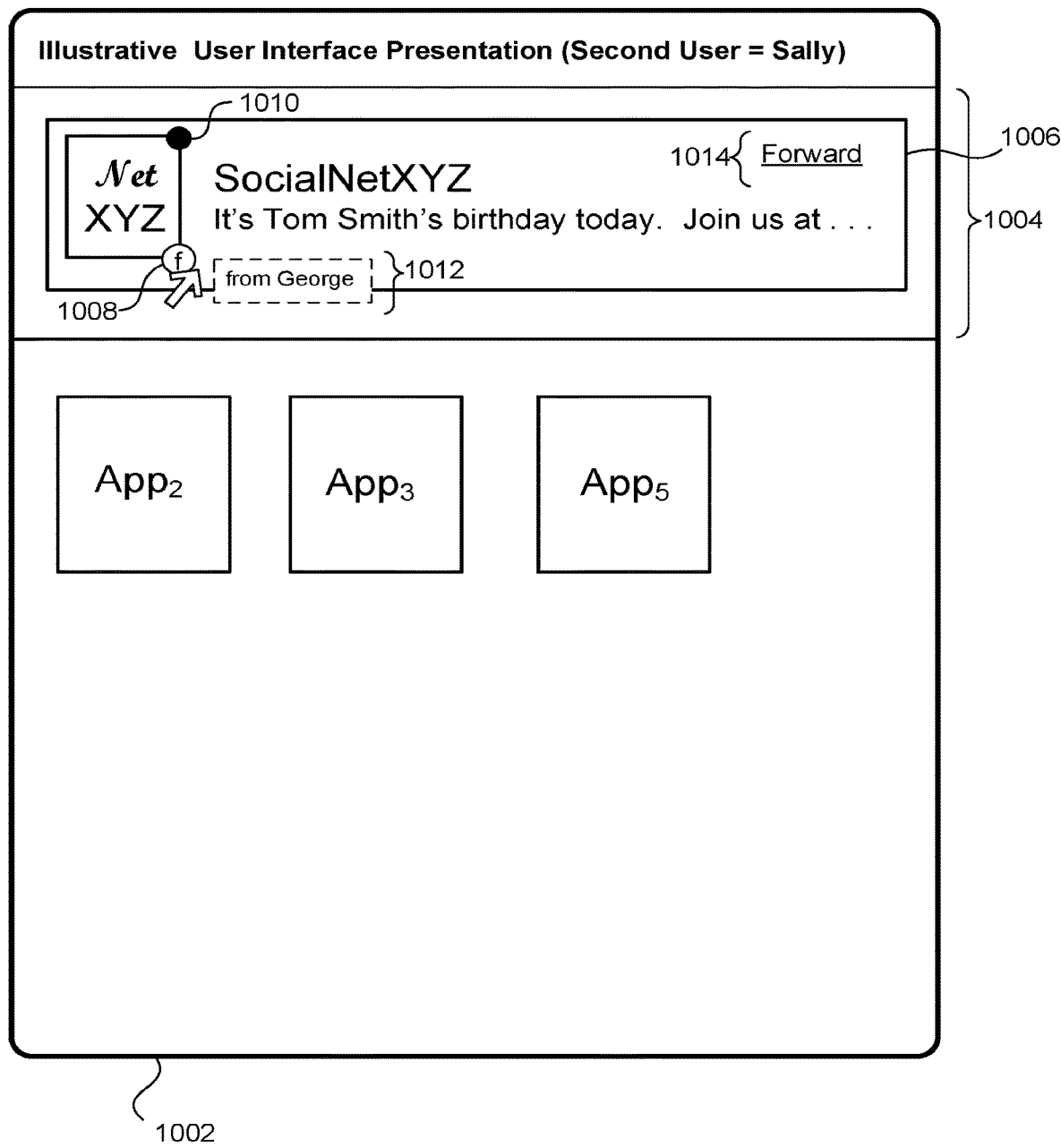
FIG. 10 shows a user interface presentation that includes a notification presentation, provided to the second user, in response to the forwarding of the notification information by the first user.

FIG. 10 shows a user interface presentation 1002 provided to the second user (Sally) when the computing device, operated by the second user, receives the forward notification information N' sent by the first user (George). The user interface presentation 1002 includes a first region 1004 that shows a notification presentation 1006. The notification presentation 1006 provides a visual representation of the forward notification information N'.

More specifically, the notification presentation 1006 can include the same informational components, and can have the same visual appearance, as the notification presentation 708 viewed by the first user. But in other implementations, the notification presentation 1006 can present a subset of informational items that are conveyed by the instance of original notification information. The notification presentation component 506 can omit originally-provided informational items for any environment-specific reason.

Further, in some implementations, the notification presentation 1006 can include supplemental informational items, not included in the notification presentation 708 displayed to the first user. For instance, an indicator 1008 can convey whether or not the notification presentation 1006 pertains to an instance of forward notification information N', rather than an instance of original notification information N. An optional indicator 1010 can convey whether or not the computing device which is displaying the notification presentation 1006 has access to the application to which the instance of forward notification information N' pertains. An optional indicator 1012 conveys the user who has sent the instance of forward notification information N', and so on. These optional indicators (1008, 1010, 1012) help the user decide the amount of attention he or she should give the notification information.

As mentioned above, the user (Sally) can invoke a forwarding command prompt 1014 to send the received forward notification information N' to yet another user.

Assume that the user (Sally) decides to click on the notification presentation 1006 shown in FIG. 10, but that the user does not have access to the application to which the notification pertains. The NPF 502 can handle this scenario in different ways. In one approach (not shown), the notification presentation component 506 can display a message or emit an audio signal which informs the user that the requested application cannot be accessed.

Figure 11:
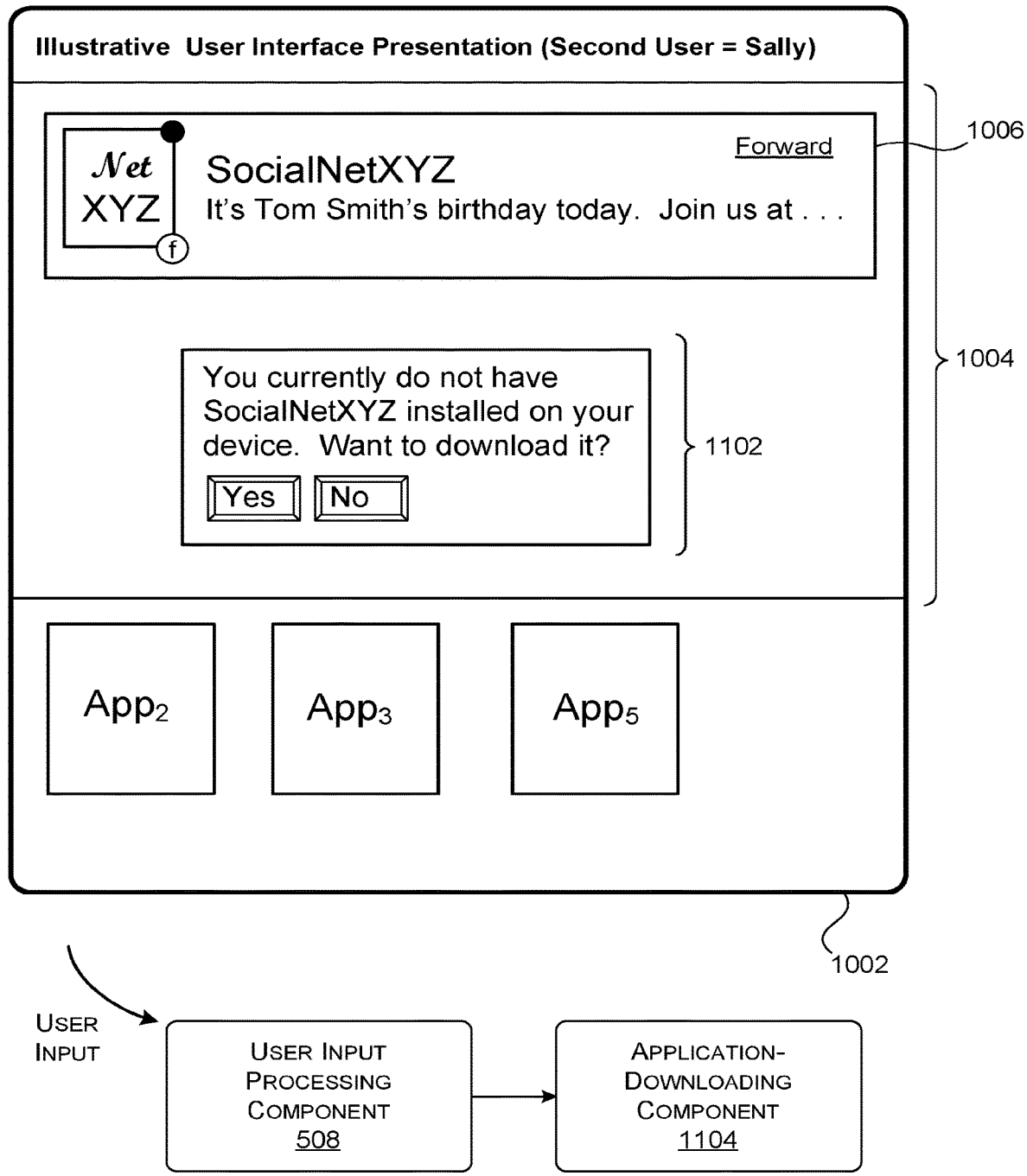
FIG. 11 shows a user interface presentation that prompts the second user to obtain a local version of an application associated with notification information, in the case that the second user receives notification information on a computing device that does not already have a local version of the application.

FIG. 11 shows another way of handling a user's input action directed to the non-enabled notification presentation 1006 (meaning that the notification presentation 1006 is not currently able to activate an application). In this case, when the user clicks on the notification presentation 1006, the notification presentation component 506 displays a message 1102 that informs the user that he or she does not currently have the appropriate application installed on his or her computing device. The message 1102 also invites the user to obtain the application. When the user clicks "Yes" in response to this message 1102, the user input processing component 508 directs the user's input to an application-downloading component 1104. The application-downloading component 1104 can then obtain the application from an appropriate source, such as an application marketplace.

B. Illustrative Processes

Figure 12:
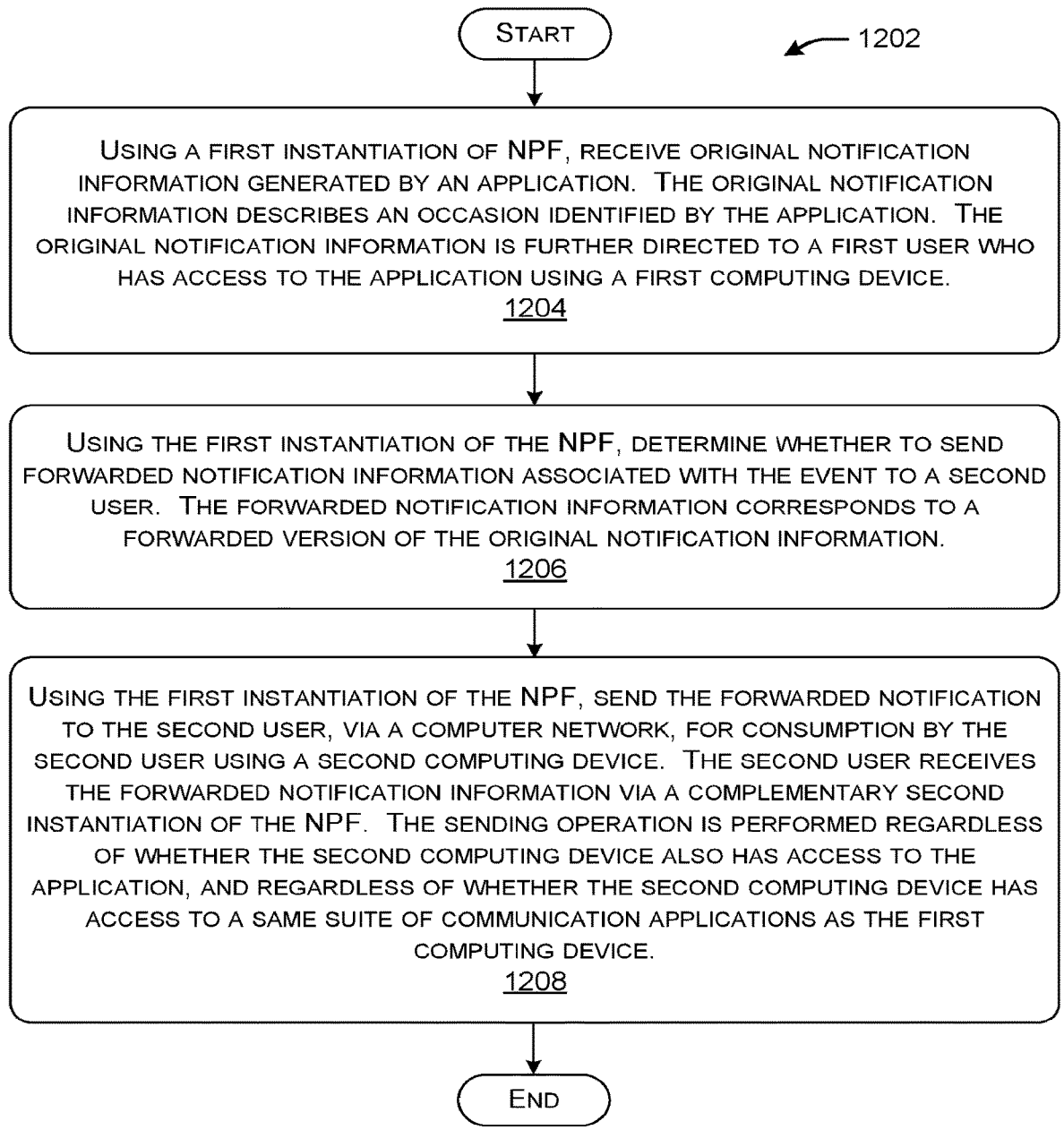
FIG. 12 shows a process which summarizes one manner of operation of the system of FIG. 4, from a perspective of the forwarding of notification information from a first user to a second user.
Figure 13:
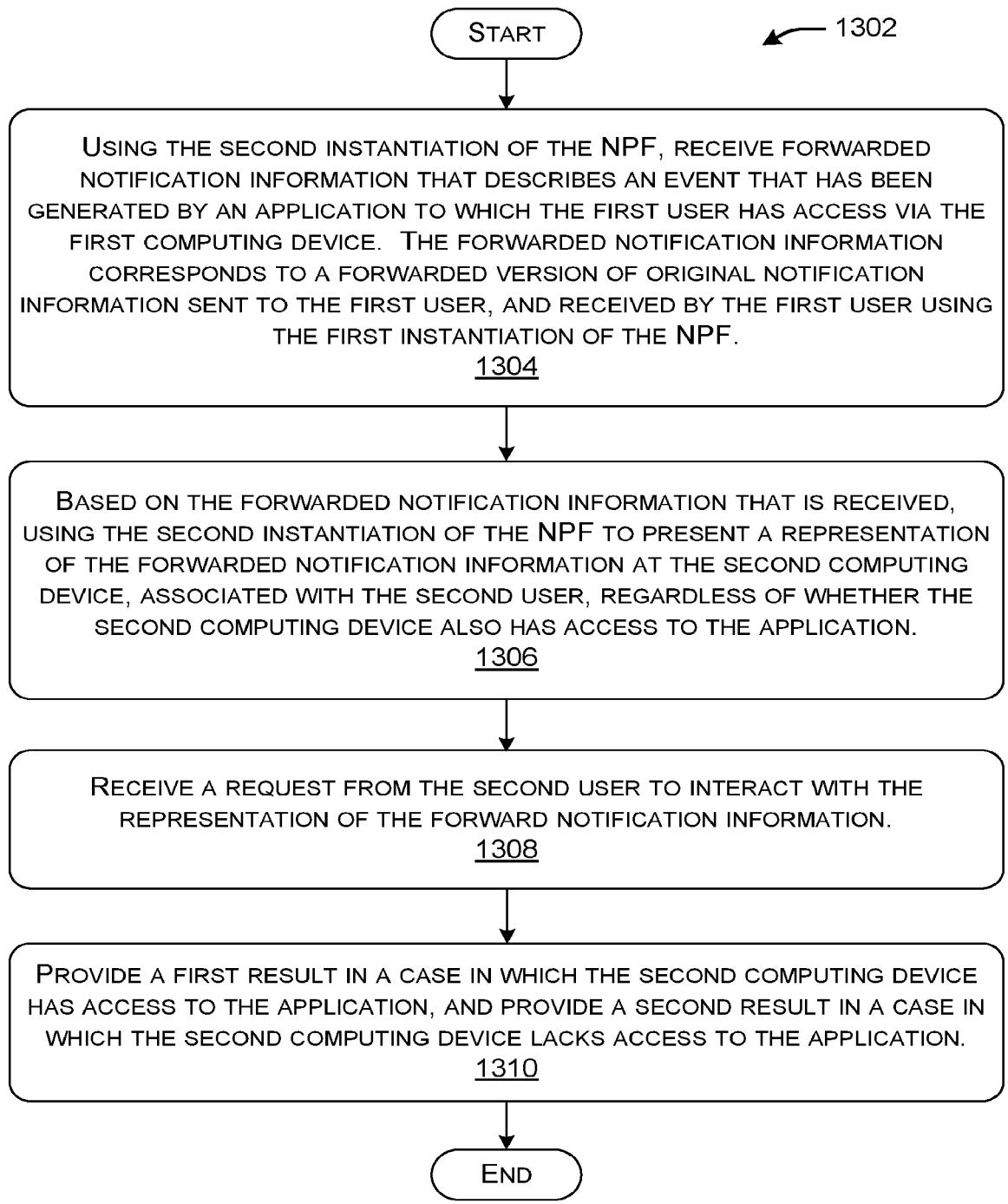
FIG. 13 shows a process which summarizes one manner of operation of the system of system of FIG. 4, from the perspective of the receiving of notification information by the second user.

FIGS. 12 and 13 shows processes (1202 and 1302) that explain the operation of the notification processing functionality (NPF) 502 of Section A in flowchart form. Since the principles underlying the operation of the NPF 502 have already been described in Section A, certain operations will be addressed in summary fashion in this section. As noted in the prefatory part of the Detailed Description, each of the flowcharts is expressed as a series of operations performed in a particular order. But the order of these operations is merely representative, and can be varied in any manner.

More specifically FIG. 12 shows a process 1202 which summarizes one manner of operation of the NPF 502, from the perspective of the forwarding of notification information from a first user to a second user. In block 1204, a first instantiation of the NPF 502 receives original notification information generated by an application. The original notification information describes an occurrence identified by the application. Further, the original notification information is directed to the first user who has access to the application using a first computing device. In block 1206, the first instantiation of the NPF 502 determines whether to send forward notification information associated with the occurrence to the second user. The forward notification information corresponds to a forwarded version of the original notification information. In block 1208, the first instantiation of the NPF 502 sends the forwarded notification to the second user, via a computer network, for consumption by the second user using a second computing device. The second user receives the forward notification information via a second instantiation of the NPF 502. Block 1208 is performed regardless of whether the second computing device also has access to the application.

FIG. 13 shows a process 1302 which summarizes one manner of operation of the NPF 502, from the perspective of the receiving of notification information by the second user. In block 1304, the second instantiation of the NPF 502 receives forward notification information that describes an occurrence pertaining to an application to which the first user has access via the first computing device. The forward notification information corresponds to a forwarded version of original notification information sent to the first user, and consumed by the first user using the first instantiation of the NPF 502. In block 1306, based on the forward notification information that is received, the second instantiation of the NPF 502 presents a representation of the forward notification information at the second computing device, associated with the second user, regardless of whether the second computing device also has access to the application. In block 1308, the second instantiation of the NPF 502 receives a request from the second user to interact with the representation of the forward notification information. In block 1310, the second instantiation of the NPF 502 provides a first result in a case in which the second computing device has access to the application, and provides a second result in a case in which the second computing device lacks access to the application. For example, the first result may entail starting the application and performing some application-specific action with respect to the forward notification information (such as, with respect to a calendar application, displaying a meeting invitation). The second result may entail providing an error message to the second user, and/or inviting the second user to download the application, etc.

Overall, the processes (1202, 1302) improve the ability of users to keep abreast of occurrences that pertain to one or more applications. For instance, the processes (1202, 1302) provide a mechanism by which notification information intended for sole consumption by one user can be forwarded to another user. As also described in Section A, the NPF 502 implements its forwarding service in a manner that is secure and non-cumbersome, particularly with respect to the second user who receives the notification information. Further still, the NPF 502 can implement the forwarding service in an environment-agnostic manner, e.g., in a manner that is agnostic with respect to the applications and platforms in use by different user computing devices.

C. Representative Computing Functionality

Figure 14:
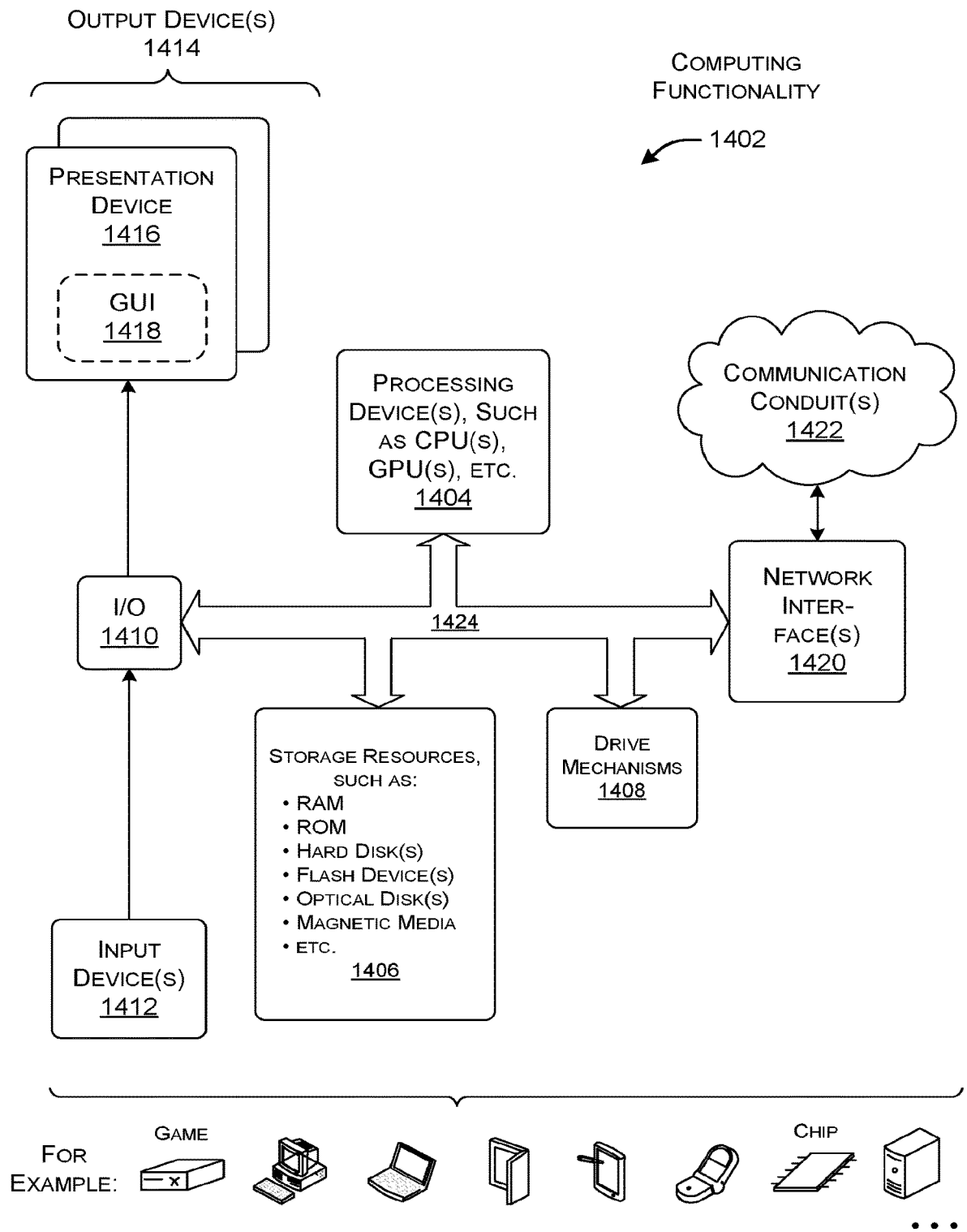
FIG. 14 shows illustrative computing functionality that can be used to implement any aspect of the features shown in the foregoing drawings.

FIG. 14 shows computing functionality 1402 that can be used to implement any aspect of the mechanisms set forth in the above-described figures. For instance, the type of computing functionality 1402 shown in FIG. 14 can be used to implement any of the user computing devices (404, 406) and the remote system(s) (412, 418) shown in FIG. 4. In all cases, the computing functionality 1402 represents one or more physical and tangible processing mechanisms.

The computing functionality 1402 can include one or more hardware processor devices 1404, such as one or more central processing units (CPUs), and/or one or more graphical processing units (GPUs), and so on. The computing functionality 1402 can also include any storage resources (also referred to as computer-readable storage media or computer-readable storage medium devices) 1406 for storing any kind of information, such as machine-readable instructions, settings, data, etc. Without limitation, for instance, the storage resources 1406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1402. The computing functionality 1402 may perform any of the functions described above when the hardware processor device(s) 1404 carry out computer-readable instructions stored in any storage resource or combination of storage resources. For instance, the computing functionality 1402 may carry out computer-readable instructions to perform each block of the processes (1202, 1302) described in Section B. The computing functionality 1402 also includes one or more drive mechanisms 1408 for interacting with any storage resource, such as a hard disk drive mechanism, an optical disk drive mechanism, and so on.

The computing functionality 1402 also includes an input/output component 1410 for receiving various inputs (via input devices 1412), and for providing various outputs (via output devices 1414). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1416 and an associated graphical user interface presentation (GUI) 1418. For instance, the notification presentation component 506 presents its various user interface presentations shown in the figures on the display device 1416. The display device 1416 may correspond to a charge-coupled display device, a cathode ray tube device, a projection mechanism, etc. Other output devices include one or more speakers, a haptic output mechanism, an archival mechanism, and so on. The computing functionality 1402 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area computer network, a wide area computer network (e.g., the Internet), point-to-point connections, etc., or any combination thereof. The communication conduit(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1402 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described, implemented by one or more computing devices, for processing notification information. The method includes: receiving forward notification information that describes an occurrence that pertains to an application to which a first user has access via a first computing device, the forward notification information corresponding to a forwarded version of original notification information sent to the first user; based on the forward notification information that is received, presenting a representation of the forward notification information to a second user using a second computing device, regardless of whether the second computing device also has access to the application; receiving a request from the second user to interact with the representation of the forward notification information; and in response to the request, providing a first result in a case in which the second computing device has access to the application, and providing a second result in a case in which the second computing device lacks access to the application. The first user receives the original notification information via first notification processing functionality, and the second user receives the forward notification information via complementary second notification processing functionality.

According to a second aspect, the forward notification information is sent in response to a manual instruction, by the first user, to send the forward notification information to the second user.

According to a third aspect, the forward notification information is sent in response to decision processing performed by a remote computing device that implements a forwarding service.

According to a fourth aspect, the method further includes determining whether the second computing device is permitted to present the representation of the forward notification information.

According to a fifth aspect, the above-referenced determining is based, at least in part, on a determination of whether the first user is authorized to send the forward notification information to the second user.

According to a sixth aspect, the second result corresponds to providing a communication to the second user that informs the second user that interaction with the application is not possible.

According to a seventh aspect, the representation of the forward notification information includes at least one indicator which distinguishes the forward notification information from original notification information that is accessible to the first user.

According to an eighth aspect, a system is described for processing notification information. The system includes a first computing device, operated by a first user, and a second computing device, operated by a second user. The system also includes: a first notification receiving component configured to receive original notification information provided by an application, the original notification information describing an occurrence identified by the application; a first notification presentation component configured to present a representation of the original notification information to the first user via the first computing device; a forwarding decision component configured to determine whether to send forward notification information associated with the occurrence to at least the second user, the forward notification information corresponding to a forwarded version of the original notification information; and a forwarding execution component configured to send the forward notification information to at least the second user, via a computer network, for consumption by the second user using the second computing device. The system further includes: a second notification receiving component configured to receive the forward notification information; and a second notification presentation component configured to present a representation of the forward notification information at the second computing device, regardless of whether the second computing device has access to the application, and regardless of whether the second computing device has access to a same suite of communication applications as the first computing device. The system further includes a notification management component configured to determine an action to take when the second user interacts with the representation of the forward notification information, based, at least in part, on whether or not the second computing device has access to the application.

According to a ninth aspect, the first computing device implements the forwarding decision component.

According to a tenth aspect, one or more remote computing devices, relative to the first computing device and the second computing device, implement at least the forwarding decision component.

According to an eleventh aspect, one or more computing devices are described for processing notification information using an instance of notification processing functionality (NPF). The device(s) include: a first notification receiving component configured to receive original notification information provided by an application, the original notification information describing an occurrence identified by the application, the original notification information further being directed to a first user who has access to the application using a first computing device; a forwarding decision component configured to determine whether to send forward notification information associated with the occurrence to at least a second user, the forward notification information corresponding to a forwarded version of the original notification information; and a forwarding execution component configured to send the forwarded notification to at least the second user, via a computer network, for consumption by the second user using a second computing device having a counterpart instance of notification processing functionality. The forwarding execution component sends the forward notification information to a second notification receiving component of the second computing device, regardless of whether the second computing device also has access to the application, and regardless of whether the second computing device has access to a same suite of communication applications as the first computing device.

According to a twelfth aspect, the first computing device implements the first notification receiving component, the forwarding decision component, and the forwarding execution component.

According to a thirteenth aspect, one or more remote computing devices, relative to the first computing device, implement at least the forwarding decision component.

According to a fourteenth aspect, the forwarding decision component includes a manual input processing component for receiving an instruction from the first user which instructs the forwarding execution component to send the forward notification information to the second user.

According to a fifteenth aspect, the device(s) further include: a notification presentation component configured to present a representation of the original notification information to the first user using the first computing device, in response to receipt of the original notification information by the first notification receiving component; and a user input processing component configured to detect interaction by the first user with the representation of the original notification information. The input processing component receives the instruction from the user input processing component in response to interaction by the first user with the representation of the original notification information.

According to a sixteenth aspect, the computing device(s) further include: a notification presentation component for presenting a representation of the original notification information to the first user using the first computing device, in response to a request, by the first user, to examine a log of prior instances of original notification information that have been received by the first notification receiving component; and a user input processing component configured to detect interaction by the first user with the representation of the original notification information. The input processing component receives the instruction from the user input processing component in response to interaction by the first user with the representation of the original notification information.

According to a seventeenth aspect, the forwarding decision component includes an automatic decision component configured to automatically determine that the forward notification information should be sent to the second user, based on decision logic.

According to an eighteenth aspect, the decision logic takes into consideration: an importance level associated with the original notification information; and/or a topic associated with the original notification information; and/or an identity of the second user; and/or a relationship between the first user and the second user; and/or a location of the second user relative to the first user.

According to a nineteenth aspect, the forward notification information includes a same set of descriptive components as the original notification information.

According to a twentieth aspect, the forward notification information includes a different set of descriptive components compared to the original notification information.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium storing computer-readable instructions thereon which, when executed by a hardware processor device, cause the hardware processor device to:
   receive a notification forwarded from a first user device having an application program installed thereon to a second user device, the notification pertaining to the application program that is not installed on the second user device;
   in response to an interaction with the notification, present an invitation to install the application program on the second user device;
   receive an input to install the application program on the second user device; and
   in response to the input, install the application program on the second user device.

2. The computer-readable storage medium of claim 1, wherein the computer-readable instructions further cause the hardware processor device to:
   determine whether the notification is permitted to be presented on the second user device.

3. The computer-readable storage medium of claim 1, wherein the computer-readable instructions further cause the hardware processor device to:
   determine whether a user of the second user device has previously received the content of the notification before the notification is presented on the second user device.

4. The computer-readable storage medium of claim 1, wherein the computer-readable instructions further cause the hardware processor device to:
   present an indicator with the notification, the indicator conveying whether the application program to which the notification pertains is installed on the second user device.

5. The computer-readable storage medium of claim 1, wherein the interaction includes a request from a user of the second user device.

6. The computer-readable storage medium of claim 1, wherein the computer-readable instructions further cause the hardware processor device to:
   present a message that the application program is not installed on the second user device.

7. The computer-readable storage medium of claim 1, wherein the computer-readable instructions further cause the hardware processor device to:
   in response to the input, download the application program from an application source onto the second user device.

8. A system, comprising:
   a hardware processor device; and
   storage resource storing computer-readable instructions thereon which, when executed by the hardware processor device, cause the hardware processor device to:
      cause an original notification pertaining to an application program to be presented on a first device associated with a first person, the first device having the application program;
      receive a forwarding instruction from the first person to forward the original notification to a second person;
      in response to the forwarding instruction, cause a forward notification to be presented on a second device associated with the second person, the second device not having the application program, the forward notification including information that is included in the original notification;
      receive a request from the second person to interact with the forward notification; and
      in response to the request, cause an invitation to install the application program to be presented on the second device.

9. The system of claim 8, wherein the computer-readable instructions further cause the hardware processor device to:
   receive the original notification from the application program.

10. The system of claim 8, wherein the computer-readable instructions further cause the hardware processor device to:
    determine whether the first person is authorized to forward the original notification to the second person.

11. The system of claim 8, wherein the computer-readable instructions further cause the hardware processor device to:
    determine that the second person is interacting with the second device.

12. The system of claim 8, wherein the original notification includes more information than the forward notification.

13. The system of claim 8, wherein the forward notification includes more information than the original notification.

14. The system of claim 8, wherein the forward notification includes an indicator that conveys that the forward notification is a forwarded instance of the original notification.

15. The system of claim 8, wherein the system is remote from the first device and the second device.

16. The system of claim 8 further comprising:
    receiving an input from the second person to install the application program on the second device, wherein the input from the second person to install the application program is received via the presented invitation to install the application program.

17. A method, comprising:
    receiving a forwarding instruction from a first device associated with a first person to forward an original notification pertaining to an application program to a second person;
    in response to the forwarding instruction, causing a forward notification to be presented on a second device on which the application program is not installed, the second device being associated with the second person;
    receiving a request from the second person to interact with the forward notification;
    in response to the request, causing an invitation to install the application program to be presented on the second device;
    receiving an input from the second person to install the application program on the second device; and
    in response to the input, obtaining the application program to be installed on the second device.

18. The method of claim 17, further comprising:
    determining whether the first person is authorized to forward the original notification to the second person.

19. The method of claim 17, further comprising:
    determining whether the second person is permitted to be presented with the forward notification.

20. The method of claim 17, wherein the input from the second person to install the application program is received via the presented invitation to install the application program.

* * * * *